(12) United States Patent
Laslau

(10) Patent No.: US 11,398,968 B2
(45) Date of Patent: Jul. 26, 2022

(54) METHODS, SYSTEMS, AND COMPUTER READABLE MEDIA FOR TESTING VIRTUALIZED NETWORK FUNCTIONS AND RELATED INFRASTRUCTURE

(71) Applicant: Keysight Technologies, Inc., Santa Rosa, CA (US)

(72) Inventor: Vlad Laslau, Bucharest (RO)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 83 days.

(21) Appl. No.: 16/039,283

(22) Filed: Jul. 18, 2018

(65) Prior Publication Data

US 2020/0028772 A1 Jan. 23, 2020

(30) Foreign Application Priority Data

Jul. 17, 2018 (RO) .............................. a 2018 00532

(51) Int. Cl.
*G01R 31/08* (2020.01)
*H04L 43/50* (2022.01)
(Continued)

(52) U.S. Cl.
CPC .......... *H04L 43/50* (2013.01); *H04L 41/0806* (2013.01); *H04L 41/145* (2013.01);
(Continued)

(58) Field of Classification Search
CPC . H04L 43/50; H04L 43/0817; H04L 43/0876; H04L 41/0806; H04L 41/145; H04L 41/5038
See application file for complete search history.

(56) References Cited

U.S. PATENT DOCUMENTS 4,792,753 A 12/1988 Iwai
5,247,517 A 9/1993 Ross et al.
(Continued)

FOREIGN PATENT DOCUMENTS

CN 104320274 A 1/2015
EP 0895375 A2 2/1999
(Continued)

OTHER PUBLICATIONS

Notice of Allowance and Fee(s) Due and Examiner-Initiated Interview Summary for U.S. Appl. No. 14/939,674 (dated Jul. 13, 2018).
(Continued)

*Primary Examiner* — Gerald A Smarth

(57) ABSTRACT

According to one method, the method occurs at a test system. The method includes receiving test configuration information for testing a NFV infrastructure; configuring, using the test configuration information, at least one virtual resource tester (VRT) for testing one or more virtual resources of the NFV infrastructure; configuring at least one VNF tester for testing at least one VNF associated with the NFV infrastructure, wherein the at least one VNF tester is deployed in a same environment as the at least one VNF and wherein the at least one VNF tester is instructed to perform behaviors that attempt to impact performance of the at least one VNF; testing the NFV infrastructure using the at least one VRT and the at least one VNF tester; and monitoring performance of the NFV infrastructure during testing using information obtained from at least one test related entity.

18 Claims, 8 Drawing Sheets

(51) Int. Cl.
*H04L 43/0876* (2022.01)
*H04L 43/0817* (2022.01)
*H04L 43/55* (2022.01)
*H04L 41/14* (2022.01)
*H04L 47/125* (2022.01)
*H04L 41/0806* (2022.01)
*H04L 9/40* (2022.01)

(52) U.S. Cl.
CPC ...... *H04L 41/5038* (2013.01); *H04L 43/0817* (2013.01); *H04L 43/0876* (2013.01); *H04L 47/125* (2013.01); *H04L 63/02* (2013.01); *H04L 63/1416* (2013.01); *H04L 63/20* (2013.01)

(56) References Cited

U.S. PATENT DOCUMENTS

| | | | |
|---|---|---|---|
| 5,343,463 A | 8/1994 | Van Tetering et al. | |
| 5,390,314 A | 2/1995 | Swanson | |
| 5,477,531 A | 12/1995 | McKee et al. | |
| 5,535,338 A | 7/1996 | Krause et al. | |
| 5,568,471 A | 10/1996 | Hershey et al. | |
| 5,571,963 A | 11/1996 | Balchin et al. | |
| 5,583,792 A | 12/1996 | Li et al. | |
| 5,590,285 A | 12/1996 | Krause et al. | |
| 5,600,632 A | 2/1997 | Schulman | |
| 5,657,438 A | 8/1997 | Wydogny et al. | |
| 5,671,351 A | 9/1997 | Wild et al. | |
| 5,761,486 A | 6/1998 | Watanabe et al. | |
| 5,787,147 A | 7/1998 | Gundersen | |
| 5,787,253 A | 7/1998 | McCreery et al. | |
| 5,822,520 A | 10/1998 | Parker | |
| 5,838,919 A | 11/1998 | Schwaller et al. | |
| 5,850,386 A | 12/1998 | Anderson et al. | |
| 5,850,388 A | 12/1998 | Anderson et al. | |
| 5,854,889 A | 12/1998 | Liese et al. | |
| 5,878,032 A | 3/1999 | Mirek et al. | |
| 5,905,713 A | 5/1999 | Anderson et al. | |
| 5,974,237 A | 10/1999 | Shurmer et al. | |
| 5,974,457 A | 10/1999 | Waclawsky et al. | |
| 5,978,940 A | 11/1999 | Newman et al. | |
| 5,982,852 A | 11/1999 | Schwartz | |
| 6,031,528 A | 2/2000 | Langfahl, Jr. | |
| 6,044,091 A | 3/2000 | Kim | |
| 6,108,800 A | 8/2000 | Asawa | |
| 6,122,670 A | 9/2000 | Bennett et al. | |
| 6,148,277 A | 11/2000 | Asava et al. | |
| 6,172,989 B1 | 1/2001 | Yanagihara et al. | |
| 6,173,333 B1 | 1/2001 | Jolitz et al. | |
| 6,189,031 B1 | 2/2001 | Badger et al. | |
| 6,233,256 B1 | 5/2001 | Dietrich et al. | |
| 6,279,124 B1 | 8/2001 | Brouwer et al. | |
| 6,295,557 B1 | 9/2001 | Foss et al. | |
| 6,317,788 B1 | 11/2001 | Richardson | |
| 6,321,264 B1 | 11/2001 | Fletcher et al. | |
| 6,345,302 B1 | 2/2002 | Bennett et al. | |
| 6,363,056 B1 | 3/2002 | Beigi et al. | |
| 6,430,617 B2 | 8/2002 | Britt et al. | |
| 6,446,121 B1 | 9/2002 | Shah et al. | |
| 6,507,923 B1 | 1/2003 | Wall et al. | |
| 6,526,259 B1 | 2/2003 | Ho | |
| 6,545,979 B1 | 4/2003 | Poulin | |
| 6,601,020 B1 | 7/2003 | Myers | |
| 6,621,805 B1 | 9/2003 | Kondylis et al. | |
| 6,678,246 B1 | 1/2004 | Smyth | |
| 6,717,917 B1 | 4/2004 | Weissberger et al. | |
| 6,826,259 B2 | 11/2004 | Hoffman | |
| 6,845,352 B1 | 1/2005 | Wang | |
| 6,917,595 B2 | 7/2005 | Chang et al. | |
| 7,099,438 B2 | 8/2006 | Rancu et al. | |
| 7,123,616 B2 | 10/2006 | Weissberger et al. | |
| 7,143,159 B1 | 11/2006 | Grace et al. | |
| 7,327,686 B2 | 2/2008 | Standridge | |
| 7,342,897 B1 | 3/2008 | Nader et al. | |
| 7,366,174 B2 | 4/2008 | MacFaden et al. | |
| 7,486,728 B2 | 2/2009 | Park | |
| 7,507,948 B2 | 3/2009 | Park et al. | |
| 7,525,473 B2 | 4/2009 | Chu et al. | |
| 7,526,691 B1 | 4/2009 | Jayabharathi et al. | |
| 7,627,669 B2 | 12/2009 | Dugatkin et al. | |
| 7,840,664 B2 | 11/2010 | Dugatkin et al. | |
| 7,873,056 B2 | 1/2011 | Higuchi et al. | |
| 7,899,048 B1 | 3/2011 | Walker et al. | |
| 7,908,130 B2 | 3/2011 | Van Ginkel et al. | |
| 8,718,070 B2 | 5/2014 | Koponen et al. | |
| 8,761,187 B2 | 6/2014 | Barde | |
| 8,914,432 B2 | 12/2014 | Hannel et al. | |
| 8,949,830 B2 | 2/2015 | Kannan et al. | |
| 8,959,185 B2 | 2/2015 | Nakil et al. | |
| 9,049,271 B1 | 6/2015 | Hobbs et al. | |
| 9,231,849 B2 | 1/2016 | Hyoudou et al. | |
| 9,647,909 B2 | 5/2017 | Kuan et al. | |
| 9,674,639 B2 | 6/2017 | Qiu et al. | |
| 9,680,728 B2 | 6/2017 | Besser | |
| 9,705,849 B2 | 7/2017 | Sood et al. | |
| 9,967,165 B2 | 5/2018 | Arora et al. | |
| 10,063,473 B2 | 8/2018 | Wenig | |
| 10,069,694 B1 * | 9/2018 | Schwartz | H04L 67/10 |
| 10,135,702 B2 | 11/2018 | Lahiri | |
| 10,579,408 B2 | 3/2020 | Wang et al. | |
| 10,686,671 B1 | 6/2020 | Mozumdar et al. | |
| 10,693,817 B1 * | 6/2020 | Melkild | H04L 41/0627 |
| 10,733,088 B1 | 8/2020 | Sommers et al. | |
| 10,868,730 B2 | 12/2020 | Mozumdar et al. | |
| 10,880,197 B2 | 12/2020 | Naskar et al. | |
| 11,323,354 B1 | 5/2022 | Sommers | |
| 2001/0016867 A1 | 8/2001 | Hu et al. | |
| 2002/0056100 A1 | 5/2002 | Shimomura et al. | |
| 2002/0105911 A1 | 8/2002 | Pruthi et al. | |
| 2002/0138226 A1 | 9/2002 | Doane | |
| 2002/0172205 A1 | 11/2002 | Tagore-Brage et al. | |
| 2002/0184527 A1 | 12/2002 | Chun et al. | |
| 2003/0009544 A1 | 1/2003 | Wach | |
| 2003/0043434 A1 | 3/2003 | Brachmann et al. | |
| 2003/0061506 A1 | 3/2003 | Cooper et al. | |
| 2003/0069952 A1 | 4/2003 | Tams et al. | |
| 2003/0139919 A1 | 7/2003 | Sher et al. | |
| 2003/0188003 A1 | 10/2003 | Sylvest et al. | |
| 2003/0231741 A1 | 12/2003 | Rancu et al. | |
| 2004/0111502 A1 | 6/2004 | Oates | |
| 2004/0111519 A1 | 6/2004 | Fu et al. | |
| 2004/0117474 A1 | 6/2004 | Ginkel et al. | |
| 2004/0236866 A1 | 11/2004 | Dugatkin et al. | |
| 2005/0021715 A1 | 1/2005 | Dugatkin et al. | |
| 2006/0072543 A1 | 4/2006 | Lloyd et al. | |
| 2006/0129847 A1 | 6/2006 | Pitsos | |
| 2007/0038744 A1 | 2/2007 | Cocks et al. | |
| 2007/0195776 A1 | 8/2007 | Zheng et al. | |
| 2007/0280243 A1 | 12/2007 | Wray et al. | |
| 2008/0044018 A1 | 2/2008 | Scrimsher et al. | |
| 2008/0186968 A1 | 8/2008 | Farinacci et al. | |
| 2009/0287837 A1 | 11/2009 | Felsher | |
| 2010/0138920 A1 | 6/2010 | Kim et al. | |
| 2010/0153055 A1 | 6/2010 | Mucha et al. | |
| 2010/0199275 A1 | 8/2010 | Mudigonda et al. | |
| 2010/0238923 A1 | 9/2010 | Cheon et al. | |
| 2010/0317420 A1 | 12/2010 | Hoffberg | |
| 2011/0116719 A1 | 5/2011 | Bilobrov | |
| 2011/0125892 A1 | 5/2011 | Rajan et al. | |
| 2012/0106423 A1 | 5/2012 | Nylander et al. | |
| 2012/0110181 A1 | 5/2012 | Tsirkin | |
| 2012/0120801 A1 | 5/2012 | Ramakrishnan et al. | |
| 2012/0290703 A1 | 11/2012 | Barabash et al. | |
| 2012/0317566 A1 | 12/2012 | Santos et al. | |
| 2013/0013107 A1 | 1/2013 | Felique | |
| 2013/0159021 A1 | 6/2013 | Felsher | |
| 2013/0288668 A1 | 10/2013 | Pragada et al. | |
| 2014/0047125 A1 | 2/2014 | Hyoudou et al. | |
| 2014/0052852 A1 * | 2/2014 | Dufour | H04L 43/50 709/224 |
| 2014/0229605 A1 | 8/2014 | Besser | |
| 2014/0229781 A1 | 8/2014 | Whetsel | |
| 2014/0229945 A1 | 8/2014 | Barkai et al. | |

(56) References Cited

U.S. PATENT DOCUMENTS

| | | |
|---|---|---|
| 2014/0269709 A1 | 9/2014 | Benny et al. |
| 2014/0317293 A1 | 10/2014 | Shatzkamer |
| 2014/0317600 A1 | 10/2014 | Klunder et al. |
| 2015/0029848 A1 | 1/2015 | Jain |
| 2015/0063166 A1 | 3/2015 | Sif et al. |
| 2015/0140956 A1 | 5/2015 | Prewitt, II et al. |
| 2015/0234725 A1* | 8/2015 | Cillis .................. G06F 11/263 714/33 |
| 2015/0236936 A1 | 8/2015 | Waldbusser |
| 2015/0317169 A1 | 11/2015 | Sinha et al. |
| 2015/0332357 A1 | 11/2015 | McBride et al. |
| 2015/0333979 A1 | 11/2015 | Schwengler et al. |
| 2015/0334030 A1 | 11/2015 | Vasseur et al. |
| 2015/0365288 A1 | 12/2015 | Van Der Merwe et al. |
| 2016/0062781 A1 | 3/2016 | Tsirkin et al. |
| 2016/0110211 A1 | 4/2016 | Karnes |
| 2016/0127333 A1* | 5/2016 | Sood .................. H04L 63/06 380/44 |
| 2016/0147987 A1 | 5/2016 | Jang et al. |
| 2016/0191545 A1 | 6/2016 | Nanda et al. |
| 2016/0232019 A1 | 8/2016 | Shah et al. |
| 2016/0248858 A1 | 8/2016 | Qiu et al. |
| 2016/0323243 A1 | 11/2016 | LeVasseur et al. |
| 2016/0352578 A1 | 12/2016 | Chen et al. |
| 2017/0026806 A1 | 1/2017 | Jampani et al. |
| 2017/0048110 A1 | 2/2017 | Wu et al. |
| 2017/0085459 A1 | 3/2017 | Xia et al. |
| 2017/0094002 A1 | 3/2017 | Kumar et al. |
| 2017/0099195 A1 | 4/2017 | Raney |
| 2017/0099197 A1 | 4/2017 | Raney |
| 2017/0118102 A1 | 4/2017 | Majumder et al. |
| 2017/0126588 A1 | 5/2017 | Anand et al. |
| 2017/0141974 A1 | 5/2017 | Lahiri |
| 2017/0163510 A1 | 6/2017 | Arora et al. |
| 2017/0214694 A1 | 7/2017 | Yan |
| 2018/0316543 A1* | 11/2018 | Hwang .................. H04L 43/50 |
| 2019/0222481 A1 | 7/2019 | Hira |
| 2019/0372881 A1 | 12/2019 | Hu et al. |
| 2020/0034173 A1* | 1/2020 | Rosenberg .......... H04L 41/5051 |
| 2020/0133688 A1 | 4/2020 | Shinde et al. |
| 2020/0280518 A1 | 9/2020 | Lee et al. |
| 2020/0296023 A1 | 9/2020 | Kumar et al. |
| 2020/0313999 A1 | 10/2020 | Lee et al. |
| 2020/0412607 A1 | 12/2020 | Guan et al. |

FOREIGN PATENT DOCUMENTS

| | | |
|---|---|---|
| EP | 3046288 A1 | 7/2016 |
| EP | 3110106 A1 | 12/2016 |
| EP | 3119034 A1 | 1/2017 |
| JP | 4620103 B2 | 1/2011 |
| WO | 02056541 A2 | 7/2002 |
| WO | WO 2014/030061 A2 | 2/2014 |
| WO | WO 2017/083024 A1 | 5/2017 |

OTHER PUBLICATIONS

Advisory Action and AFCP 2.0 Decision for U.S. Appl. No. 14/939,674 (dated May 4, 2018).

Final Office Action for U.S. Appl. No. 14/939,674 (dated Feb. 9, 2018).

Corrected Notice of Allowability for U.S. Appl. No. 14/960,865 (dated Feb. 7, 2018).

Notice of Allowance and Fee(s) Due for U.S. Appl. No. 14/960,865 (dated Jan. 2, 2018).

Non-Final Office Action for U.S. Appl. No. 14/939,674 (dated Sep. 21, 2017).

Non-Final Office Action for U.S. Appl. No. 14/960,865 (dated Apr. 21, 2017).

Notice of Allowance and Fee(s) Due & Examiner-Initiated Interview Summary for U.S. Appl. No. 13/765,628 (dated Jan. 10, 2017).

Notification of Transmittal of the International Search Report and the Written Opinion of the International Searching Authority, or the Declaration for International Application No. PCT/US2016/054163 (dated Jan. 5, 2017).

Advisory Action and Examiner Initiated Interview Summary for U.S. Appl. No. 13/765,628 (dated Oct. 17, 2016).

Final Office Action for U.S. Appl. No. 13/765,628 (dated Jul. 27, 2016).

"Virtual Taps", Net Optics: Architecting Visibility Into Your Netowrk, p. 1-5 (accessed Jun. 30, 2016).

"Network function virtualization," https://en.wikipedia.org/wiki/Network_function_virtualization, pp. 1-7 (Nov. 23, 2015).

"Software-defined networking," https://en.wikipedia.org/wiki/Software-defined_networking, pp. 1-9 (Nov. 13, 2015).

"Ixia Phantom vTap™ with TapFlow™ Filtering," Ixia Data Sheet, Document No. 915-6805-01 Rev K, pp. 1-4 (Jul. 2015).

Non-Final Office Action for U.S. Appl. No. 13/765,628 (dated Dec. 1, 2014).

Communication pursuant to Article 94(3) EPC for European Application Serial No. 16 864 727.9 (dated May 4, 2020).

Commonly-Assigned, co-pending U.S. Appl. No. 17/069,768 for "Methods, Systems and Computer Readable Media for Active Queue Management," (Unpublished, filed Oct. 13, 2020).

Commonly-assigned, co-pending U.S. Appl. No. 17/067,627 for "Methods, Systems, and Computer Readable Media for Network Testing Using Switch Emulation," (Unpublished, filed Oct. 9, 2020).

"Networking/SAI," Open Compute, pp. 1-6 (Oct. 2020).

Han et al., "Virtualization in Programmable Data Plane: A Survey and Open Challenges," IEEE Open Journal of the Communications Society, pp. 1-7 (2020).

Byagowi et al., "Bringing the F16 Network into the Lab," OCP Global Summit, pp. 1-16 (2020).

Siron, "What is the Hyper-V Virtual Switch and How Does it Work?," Altaro, pp. 1-22 (Sep. 26, 2019).

Zhang et al., "MPVisor: A Modular Programmable Data Plane Hypervisor," SOSR' 17, pp. 1-2 (Apr. 3-4, 2017).

Khalidi, "SONiC: The networking switch software that powers the Microsoft Global Cloud," Blog(/en-us/blog/) Cloud Strategy, pp. 1-10 (Mar. 8, 2017).

Zhang et al., "HyperV: A High Performance Hypervisor for Virtualization of the Programmable Data Plane," 2017 26th International Conference on Computer Communication and Networks (ICCCN), pp. 1-9 (2017).

Cziva et al., "High-Performance Virtualized SDN Switches for Experimental Network Testbeds," SI:SC16-INDIS, pp. 1-14 (Nov. 8, 2016).

Kim et al., "In-band Network Telemetry (INT)," pp. 1-28 (Jun. 2016).

Communication under Rule 71(3) EPC Intention to Grant for European Patent Application Serial No. 16 864 727.9 (dated Feb. 18, 2021).

Non-Final Office Action for U.S. Appl. No. 17/069,768 (dated Feb. 4, 2021).

Notice of Allowance and Fee(s) Due for U.S. Appl. No. 17/067,627 (dated Aug. 20, 2021).

Final Office Action for U.S. Appl. No. 17/069,768 (dated Jul. 9, 2021).

Decision to grant a European patent pursuant to Article 97(1) EPC for European Patent Application Serial No. 16864727.9 (dated Jul. 1, 2021).

Office Action for Chinese Patent Application Serial No. 2021051802456380 (dated May 21, 2021).

Giotis et al., "Policy-based Orchestration of NFV Services in Software-Defined Networks," IEEE, pp. 1-5 (2015).

Xia et al., "Resource Optimization for Service Chain Monitoring in Software-Defined Networks," Fourth European Workshop on Software Defined Networks, IEEE, pp. 1-6 (2015).

Notice of Allowance and Fee(s) Due for U.S. Appl. No. 17/067,627 (dated Feb. 8, 2022).

Advisory Action for U.S. Appl. No. 17/069,768 (dated Sep. 28, 2021).

Notice of Allowance and Fee(s) Due for U.S. Appl. No. 17/067,627 (dated Oct. 22, 2021).

(56) References Cited

OTHER PUBLICATIONS

Notification of the Decision to Grant a Patent Right for Patent for Invention for Chinese Patent Application Serial No. 201680065423.9 (dated Oct. 11, 2021).
Non-Final Office Action for U.S. Appl. No. 17/069,768 (dated Jan. 27, 2022).

* cited by examiner

METHODS, SYSTEMS, AND COMPUTER READABLE MEDIA FOR TESTING VIRTUALIZED NETWORK FUNCTIONS AND RELATED INFRASTRUCTURE

PRIORITY CLAIM

This application claims the benefit of Romanian Patent Application No. a 2018 00532, filed Jul. 17, 2018; the disclosure of which is incorporated herein by reference in its entirety.

TECHNICAL FIELD

The subject matter described herein relates to network virtualization. More specifically, the subject matter relates to methods, systems, and computer readable media for testing virtualized network functions and related infrastructure.

BACKGROUND

Network operators generally prefer network architectures that are scalable and cost efficient. Network function virtualization (NFV) is a network architecture concept that utilizes virtualized network functions (VNFs) (e.g., virtual machines or virtual containers executing software and processes configured to perform one or more network functions) that can execute on NFV infrastructure, e.g., virtual resources implemented using cloud-based or shared physical resources. By using VNFs to perform network functions, network operators can scale their network based on current workload or demand, e.g., by starting and stopping instances of VNFs as needed. Further, by using VNFs, the need for custom hardware appliances for each network function is abated.

While NFV may reduce the need for specialized hardware for network functions or related services, issues can arise when configuring virtualized network functions and related environments. For example, testing, troubleshooting, and isolating faults can be more difficult in environments that use NFV, especially if problems are caused or exacerbated by underlying NFV infrastructure (e.g., virtual resources) and/or related NFV management and orchestration (MANO) entities (e.g., a NFV orchestrator, a VNF manager, and a virtualized infrastructure manager (VIM)) since test tools generally lack such testing features.

Accordingly, a need exists for methods, systems, and computer readable media for testing virtualized network functions and related infrastructure.

SUMMARY

Methods, systems, and computer readable media for testing virtualized network functions and related infrastructure are disclosed. According to one method, the method occurs at a test system implemented using at least one processor and a memory. The method includes for testing a Network function virtualization (NFV) infrastructure; configuring, using the test configuration information, at least one virtual resource tester (VRT) for testing one or more virtual resources of the NFV infrastructure, wherein the NFV infrastructure is implemented using at least one physical computing platform comprising a plurality of physical resources; configuring at least one virtualized network function (VNF) tester for testing at least one VNF associated with the NFV infrastructure, wherein the at least one VNF tester is deployed in a same environment as the at least one VNF and wherein the at least one VNF tester is instructed to perform behaviors that attempt to impact performance of the at least one VNF; testing the NFV infrastructure by testing the one or more virtual resources of the NFV infrastructure using the at least one VRT and testing the at least one VNF associated with the NFV infrastructure using the at least one VNF tester; and monitoring performance of the NFV infrastructure during testing using information obtained from at least one test related entity.

According to one system, the system includes a test system implemented using at least one processor and a memory. The test system is configured for: receiving test configuration information for testing a NFV infrastructure; configuring, using the test configuration information, at least one VRT for testing one or more virtual resources of the NFV infrastructure, wherein the NFV infrastructure is implemented using at least one physical computing platform comprising a plurality of physical resources; configuring at least one VNF tester for testing at least one VNF associated with the NFV infrastructure, wherein the at least one VNF tester is deployed in a same environment as the at least one VNF and wherein the at least one VNF tester is instructed to perform behaviors that attempt to impact performance of the at least one VNF; testing the NFV infrastructure by testing the one or more virtual resources of the NFV infrastructure using the at least one VRT and testing the at least one VNF associated with the NFV infrastructure using the at least one VNF tester; and monitoring performance of the NFV infrastructure during testing using information obtained from at least one test related entity.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored therein computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which:

FIG. 4 is a screenshot illustrating an example user interface for test suite template creation;

DETAILED DESCRIPTION

The subject matter described herein relates to methods, systems, and computer readable media for virtualized network functions and related infrastructure. When testing NFV environments, it may be desirable to model a test or related workload such that the test is relevant to real-world scenarios and conditions. Further, it may be desirable to design the test or related workload such that issues with NFV infrastructure and/or NFV management and orchestration (MANO) entities are discovered and/or identified.

In accordance with some aspects of the subject matter described herein, a NFV test system or a related entity may receive test configuration information for testing a NFV infrastructure; configure, using the test configuration information, at least one virtual resource tester (VRT) for testing one or more virtual resources of the NFV infrastructure, wherein the NFV infrastructure is implemented using at least one physical computing platform comprising a plurality of physical resources; configure at least one VNF tester for testing at least one VNF associated with the NFV infrastructure, wherein the at least one VNF tester is deployed in a same environment as the at least one VNF and wherein the at least one VNF tester is instructed to perform behaviors that attempt to impact performance of the at least one VNF; testing the NFV infrastructure by testing the one or more virtual resources of the NFV infrastructure using the at least one VRT and testing the at least one VNF associated with the NFV infrastructure using the at least one VNF tester; and monitoring performance of the NFV infrastructure during testing using information obtained from at least one test related entity.

By using VNF testers that attempt to impact performance of VNFs that use a same NFV infrastructure, using VRTs to test virtual resources in the NFV infrastructure, and monitoring test related performance of the NFV infrastructure from various sources, test system 202 can identify issues with NFV infrastructure and VIM 136, e.g., issues involving VNF isolation, VNF management, virtual resource management and usage, VIM interaction, and/or VNF performance monitoring.

Reference will now be made in detail to example embodiments of the subject matter described herein, examples of which are illustrated in the accompanying drawings. Wherever possible, the same reference numbers will be used throughout the drawings to refer to the same or like parts.

Figure 1:
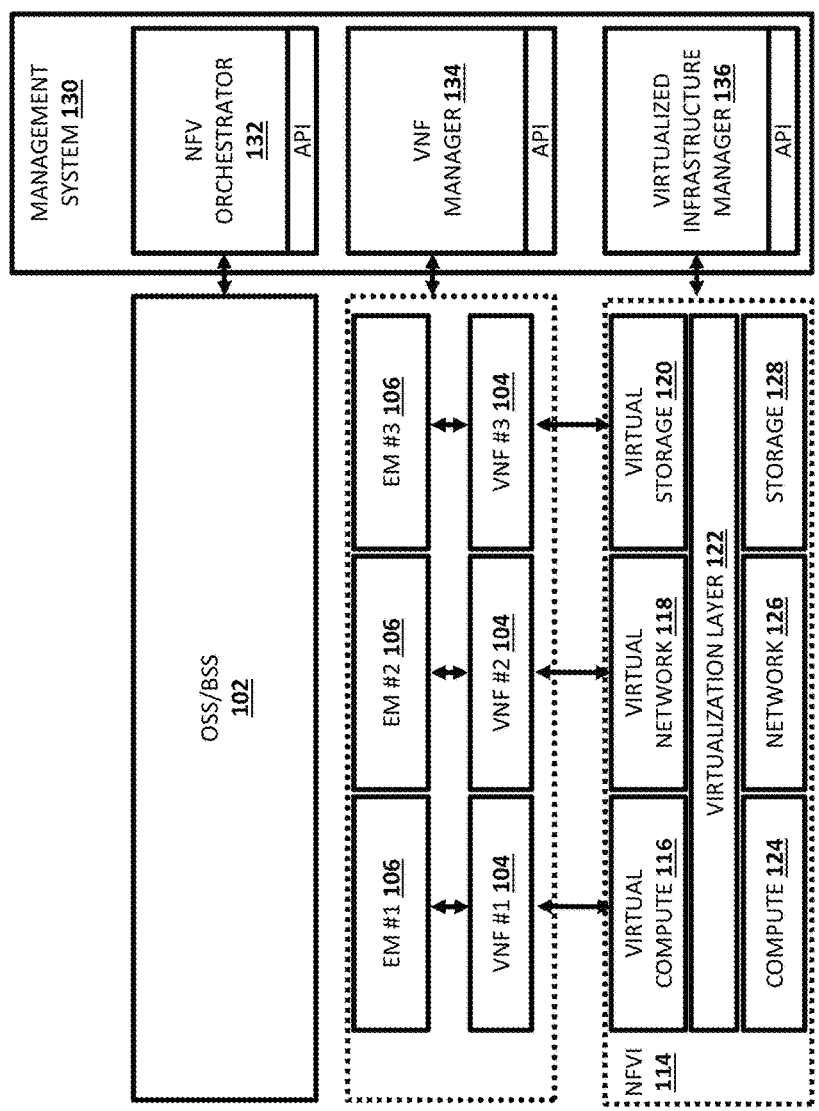
FIG. 1 is a diagram illustrating an example computing environment comprising virtualized network functions and related infrastructure.

FIG. 1 is a diagram illustrating an example computing environment 100 comprising virtualized network functions and related infrastructure. Computing environment 100 may include one or more networks and/or one or more computer platforms, nodes, or devices. Referring to FIG. 1, computing environment 100 may include an operation support system and/or business support system (OSS/BSS) 102, virtualized network function (VNFs) 104, element managers (EMs) 106, NFV infrastructure (NFVI) 114, and a management system 130.

OSS/BSS 102 may represent any suitable entity or entities (e.g., software executing on a hardware processor) for perform various management services for managing a network, e.g., a NFV environment. For example, OSS/BSS 102 may provide service management, customer management, product management, order management, network management, fault management, and/or configuration management. In some embodiments, OSS/BSS 102 may communicate with an NFV orchestrator 132 (e.g., via an Os-MA interface) for performing various actions associated with managing an NFV environment. In some embodiments, OSS/BSS 102 may also include or interact with a storage entity containing service, VNF, and infrastructure description information. In such embodiments, the storage entity may communicate with an NFV orchestrator 132 (e.g., via an Se-MA interface).

Each of VNFs 104 may represent any suitable entity (e.g., software stored in a memory and/or executing using at least one processor) for performing one or more network functions. In some embodiments, each of VNFs 104 may be a logical construct (e.g., virtual machines (VM) or virtual containers) implemented using NFVI 114, e.g., virtual resources implemented using hardware or physical resources from one or more locations, devices, and/or platforms. For example, VNFs 104 may include a load balancing function, an intrusion detection function, an intrusion protection function, an antivirus function, a firewall function, an antispam function, a switching function, or a routing function.

Each of EMs 106 may represent any suitable entity (e.g., software stored in a memory and/or executing using at least one processor) for functional management of one or more of VNFs 104. For example, EMs 106 may perform fault, configuration, accounting, Performance, and security management for one or more of VNFs 104. In some embodiments, each of EMs 106 may be VNF or a logical construct implemented using NFVI 114, e.g., virtual resources implemented using hardware or physical resources from one or more locations, devices, and/or platforms. In some embodiments, EMs 106 may use proprietary and/or non-proprietary interfaces when communicating or managing one or more of VNFs 104.

NFVI 114 may represent the environment in which VNFs 104 and/or other virtual functions execute or run. NFVI 114 may virtual resources (e.g., virtual compute (VC) resources 116, virtual network (VN) resources 118, and virtual storage (VS) resources 120), a virtualization layer 122 (e.g., a hypervisor and/or other functionality for virtualizing physical resources into virtual resources), and physical resources (e.g., compute resources 124, network resources 126, storage resources 128). In some embodiments, NFVI 114 may communicate with VIM 136 (e.g., via an NF-Vi interface). In some embodiments, NFVI 114 may communicate with VNFs 104 (e.g., via a Vn-Nf interface).

Virtualization layer 122 represent any suitable entity or entities (e.g., software executing on a hardware processor) for abstracting physical resources into virtual resources. For example, virtualization layer 122 may include a hypervisor and/or other software for creating and operating VMs by decoupling software from hardware. In some embodiments, virtualization layer 122 may communicate with storage resources 126 or other physical resources (e.g., via a Vi-Ha interface or another interface).

Management system 130 may represent any suitable entity or entitles (e.g., software stored in a memory and/or executing using at least one processor) for performing various NFV management and orchestration functions. Management system 130 may include NFV orchestrator 132, VNF manager 134, and virtualized infrastructure manager (VIM) 136. NFV Orchestrator 132 may represent any suitable entity or entitles (e.g., software stored in a memory and/or executing using at least one processor) for managing policies and service levels across network resources (e.g., servers, data storage, and/or switches) using automated workflows, provisioning, and other resource management techniques. In some embodiments, NFV orchestrator 132 may generate, maintain, and tear down service chains (e.g., network services comprising one or more of VNFs 104). In some embodiments, NFV Orchestrator 132 may enable creation of end to end services across multiple VNFs and may be responsible for global resource management of NFVI resources. In such embodiments, NFV Orchestrator 132 may perform its functions by communicating with VNF manager 134 and VIM 136. For example, NFV orchestrator 132 may communicate with VNF manager 134 (e.g., via an Or-Vnfm interface) and NFV orchestrator 132 may communicate with VIM 136 (e.g., via a Vi-Vnfm interface).

VNF manager 134 may represent any suitable entity or entities (e.g., software executing on a hardware processor) for managing one or more of VNFs 104. For example, VNF manager 134 may manage setting up, maintaining, and tearing down VNFs 104. In this example, VNF manager 134 may be responsible for managing the virtual side of VNFs 104, e.g., by requesting virtual resources for VNFs 104 via VIM 136. In some embodiments, VNF manager 134 may communicate with VIM 136 (e.g., via an Vi-Vnfm interface). In some embodiments, VNF manager 134 may communicate with NFV orchestrator 132 (e.g., via an Or-Vnfm interface). In some embodiments, VNFs 104 and EMs 106 may communicate with VNF manager 134 (e.g., via an Ve-Vnfm interface).

VIM 136 may represent any suitable entity or entities (e.g., software executing on a hardware processor) for managing NFVI 114. For example, VIM 136 may manage and control virtual resources, e.g., VC resources 116, VN resources 118, and VS resources 120. In this example, in response to receiving resource requests from VNF manager 134, VIM 136 may identify and allocate virtual resources for VNFs 104 or other virtual functions. In some embodiments, VIM 136 may communicate with NFVI 114 or entities therein (e.g., via an NF-Vi interface). In some embodiments, VIM 136 may communicate with NFV orchestrator 132 (e.g., via an Or-Vi interface).

It will be appreciated that FIG. 1 is for illustrative purposes and that various depicted entities, their locations, and/or their functions described above in relation to FIG. 1 may be changed, altered, added, or removed.

Figure 2:
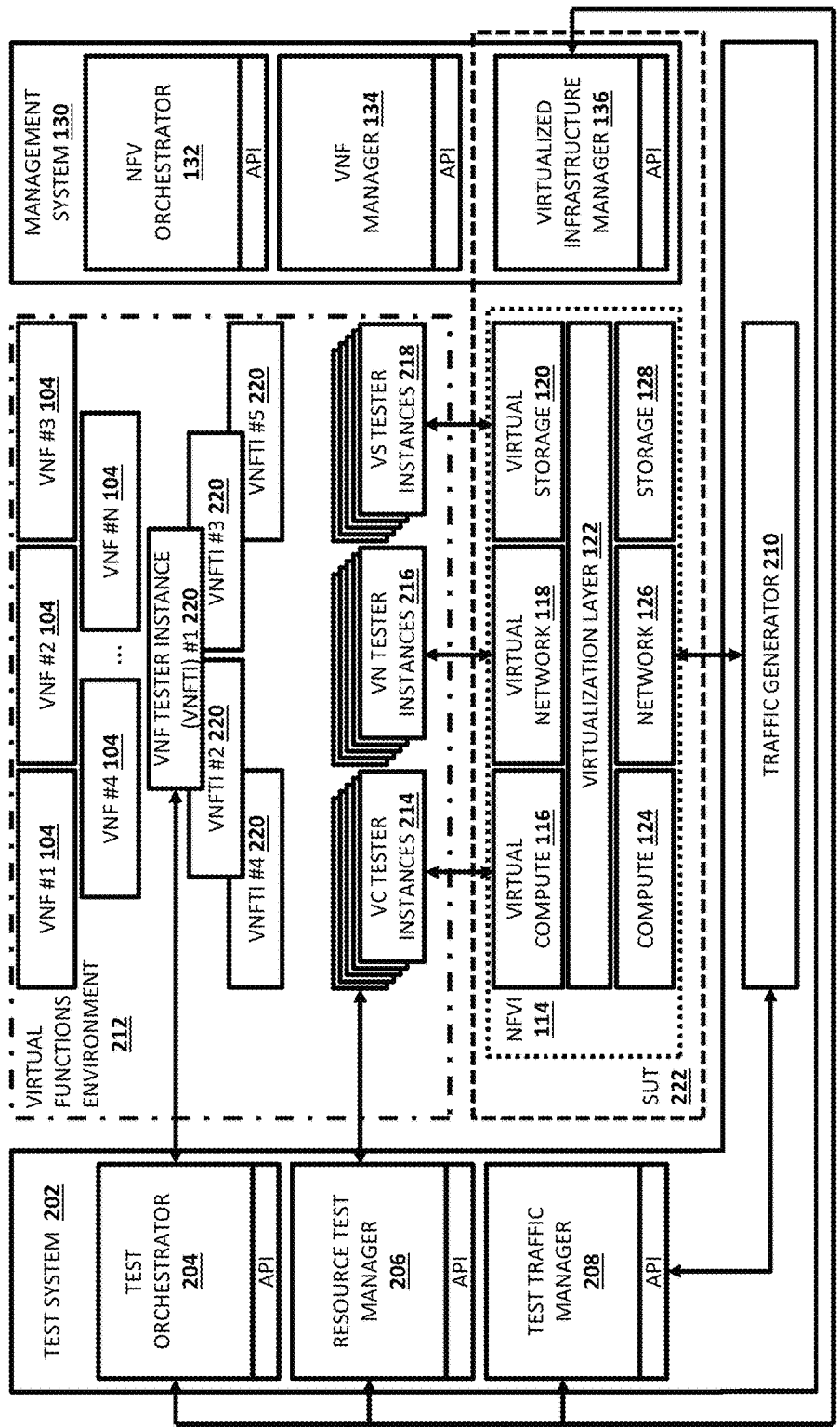
FIG. 2 is a diagram illustrating an example test environment for testing virtualized network functions and related infrastructure.

FIG. 2 is a diagram illustrating an example test environment 200 for testing virtualized network functions and related infrastructure. Test environment 200 may include computing environment 100 or portions thereof, e.g., OSS/BSS 102, VNFs 104, NFVI 114, and management system 130. Test environment 200 may also include test system 202. Test system 202 may represent any suitable entity or entities (e.g., one or more computing platforms, nodes, or devices) associated with testing one or more system(s) under test (SUT) 222 (e.g., NFVI 114 and VIM 136). For example, test system 202 may generate and send traffic to SUT 222 and/or receive traffic from SUT 222 and may analyze one or more performance aspects associated with SUT 222.

SUT 222 may be any suitable entity or entities (e.g., devices, systems, or platforms) for receiving, processing, forwarding, and/or sending one or more messages (e.g., packets). In some embodiments, SUT 222 may include NFVI 114 (e.g., virtual resources, virtualization layer 122, and physical resources) and VIM 136. For example, SUT 222 may include VC resources 116 (e.g., virtual CPUs), VN resources 118 (e.g., virtual switches), and VS resources 120 (e.g., virtual memory and/or virtual storage disks).

In some embodiments, test system 202 may include a stand-alone tool, a testing device, a network equipment test device or platform, or software executing on one or more processor(s). In some embodiments, test system 202 may be a single device or node or may be distributed across multiple devices or nodes. In some embodiments, test system 202 may include one or more modules for performing various test related functions. For example, test system 202 may "wrap around" various components and/or interfaces associated with SUT 222. In this example, test system 202 may include functionality for emulating various different nodes or entities and may communicate with SUT 222 or components therein using various internal and/or external communications interfaces.

Test system 202 may include a test orchestrator (TO) 204, a resource test manager (RTM) 206, a test traffic manager (TTM) 208, and a traffic generator 210. TO 204 may be any suitable entity or entities (e.g., software executing on one or more processors, a field-programmable gateway array (FPGA), and/or an application-specific integrated circuit (ASIC), or a combination of software, an FPGA, and/or an ASIC) for performing one or more aspects associated with testing SUT 222 and/or various aspects thereof. In some embodiments, TO 204 may be implemented using one or more processors and/or memory.

In some embodiments, TO 204 may include functionality for initiating deployment of various tester instances 214-220 (e.g., VC tester instances 214, VN tester instances 216, VS tester instances 218, and VNFTIs 220) into virtual functions environment 212. For example, TO 204 may receive and use configuration information about the environment and/or SUT 222 to generate one or more workloads such that various aspects of NFVI 114 and VIM 136 are tested, e.g., VNF isolation, VNF creation, and VNF destruction. In this example, using the configuration information TO 204 may communicate with other entities in test system 202 (e.g., RTM 206 and TTM 208) and/or management system 130 to generate virtual resources testers (VRTs) 214-218 (e.g., VC tester instances 214, VN tester instances 216, and VS tester instances 218) for testing one or more virtual resources in NFVI 114 and to generate VNF tester instances (VNFTIs) 220 for impacting or attempting to impact existing VNFs 104. use configuration information about virtual functions environment 212 and/or SUT 222 to generate one or more workloads such that various aspects of NFVI 114 and VIM 136 are tested, e.g., VNF isolation, VNF creation, and VNF destruction. Continuing with this example, TO 204 may monitor statistics, metrics, and/or other useful information from one or more test related entities (e.g., VC tester instances 214, VN tester instances 216, VS tester instances 218, VNFTI 220, and/or VIM 136) to determine performance of SUT 222 or entities therein.

RTM 206 may be any suitable entity or entities (e.g., software executing on one or more processors, a FPGA, and/or an ASIC, or a combination of software, an FPGA, and/or an ASIC) for performing one or more aspects associated with testing NFVI 114 or virtual resources therein. In some embodiments, RTM 206 may be implemented using one or more processors and/or memory. In some embodiments, RTM 206 may communicate with various nodes or entities using one or more communications interfaces, e.g., a command line interface (CLI), a representational state transfer (REST) interface, an application programming interface (API), etc.

In some embodiments, RTM 206 and/or other entities may include or utilize an open platform for NFV (OPNFV) test manager and may configure tester instances 214-220 using one or more open source test tools and applications, e.g., PKTGEN, FIO, LM Bench, LM Bench, Unix Bench, and/or Stress-NG.

In some embodiments, RTM 206 may include functionality for deploying various VRTs 214-218 into virtual functions environment 212. For example, after receiving instructions from TO 204, RTM 206 may send instructions to VIM 136 for creating VRTs 214-218. In this example, RTM 206 may facilitate creating individual tester instances for testing different types of virtual resources in the same environment of existing VNFs 104 (e.g., virtual functions environment 212) that use the virtual resources.

In some embodiments, TO 204 and/or RTM 206 may include functionality for deploying VNFTIs 220 into virtual functions environment 212. For example, TO 204 and/or RTM 206 may send instructions to VIM 136 for creating VNFTIs 220. In this example, TO 204 and/or RTM 206 configure the behavior of the VNFTIs 220 such that they act as "noisy neighbors", e.g., VNFs that attempt to steal or use resources associated with existing VNFs 104 in virtual functions environment 212. Continuing with this example, test system 202 or a related entity may monitor SUT 222 and/or obtain test related metrics to determine whether VNFTIs 220 negatively impacted VNFs 104 and, if the impact was significant (e.g., as determine by threshold values), test system 202 may notify test operator that NFVI 114 and/or VIM 136 regarding possible issues with isolating VNFs 104 from other VNFs or resource usages.

TTM 208 may be any suitable entity or entities (e.g., software executing on one or more processors, a FPGA, and/or an ASIC, or a combination of software, an FPGA, and/or an ASIC) for performing one or more aspects associated with generating test traffic (e.g., packets). In some embodiments, TTM 208 may be implemented using one or more processors and/or memory.

In some embodiments, TTM 208 may include functionality for generating and/or configuring a test traffic template that defines test traffic for testing SUT 222. For example, after receiving a test plan from TO 204, TTM 208 may configure a test traffic template that indicates a workload (e.g., one or more packet flows) that mimics a real-life scenario or test case based on the test plan. In this example, TTM 208 may send the test traffic template and/or other instructions to traffic generator 210 such that test traffic can be generated and sent according to the test traffic template and/or other instructions.

Traffic generator 210 may be any suitable entity or entities (e.g., software executing on one or more processors, a FPGA, and/or an ASIC, or a combination of software, an FPGA, and/or an ASIC) for performing one or more aspects associated with generating and sending test traffic (e.g., receiving packets, transmitting packets, and/or processing packets). In some embodiments, traffic generator 210 may be configured to simulate or emulate packets associated with various nodes or devices, e.g., user devices, network nodes in external networks, etc.

In some embodiments, traffic generator 210 may be a physical device or appliance (e.g., an IxNetwork traffic generator) and may include one or more network interface card (NICs) and/or Xcellon-Ultra cards manufactured by IXIA®. In some embodiments, traffic generator 210 may be a virtual device or appliance (e.g., an IxNetwork VE traffic generator) and may be software or logic executing in a VM or virtual container.

In some embodiments, traffic generator 210 may include functionality for utilizing a test traffic template or other instructions from TTM 208 when generating and sending test traffic. For example, after receiving a test traffic template and/or other instructions from TTM 208, TTM 208 may generate and send test traffic to SUT 222 (e.g., VIM 136 or NFVI 114) via external communications interfaces (e.g., IP network interfaces). In this example, the test traffic may appear to originate from one or more external nodes (e.g., a user device or the Internet) and may include requests and responses based on the external nodes being emulated.

Each of tester instances 214-220 (e.g., VC tester instances 214, VN tester instances 216, VS tester instances 218, and VNFTIs 220) may represent any suitable entity (e.g., software stored in a memory and/or executing using at least one processor) for performing one or more test functions. Each of tester instances 214-220 may be a logical construct (e.g., virtual machines (VM) or virtual containers) implemented using NFVI 114, e.g., virtual resources implemented using hardware or physical resources from one or more locations, devices, and/or platforms.

In some embodiments, tester instances 214-220 may include tools or applications for testing a particular type of VNF, virtual resource, or a related benchmark or area of performance. For example, VC tester instance 214 may execute one or more tests using a tool (e.g., via a command line interface) to determine a maximum, a minimum, and an average operations per second (OPS) for virtual compute resources 116. In another example, VN tester instance 216 may execute one or more tests using a tool (e.g., via a command line interface) to determine a maximum, a minimum, and an average packet loss for VN resources 118. In another example, VS tester instance 218 may execute one or more tests using a tool (e.g., via a command line interface) to determine a maximum, a minimum, and an average memory latency for VS resources 120. Some example tools or applications that may be executed or used by one or more of tester instances 214-220 are indicated in Table 1 below.

TABLE 1

Virtual Resource Test Tools

| RESOURCE | METHODOLOGY | TOOL |
| --- | --- | --- |
| Virtual Network Resource(s) | Traffic Generation | PKTGEN |
| Virtual Storage Resource(s) | Disk Read/Write | FIO |
| Virtual Compute Resource(s) | Memory Latency | LM Bench |
| Virtual Compute Resource(s) | Memory Bandwidth | LM Bench |
| Virtual Compute Resource(s) | CPU Performance | Unix Bench |
| VNF(s)/VIM | VNF/Resource Stealer | Stress-NG |

In some embodiments, test system 202 and/or related entities (e.g., TC 204, RTM 206, TTM 208 and/or traffic generator 210) may be configured to validate the functionality and benchmark the performance of virtualized network infrastructures, e.g., NFVI 114. For example, by deploying real workloads on top of SUT 222, test system 202 and/or related entities can provide key insights into the capability of the NFVI 114 to sustain VNF workloads required by customers (e.g., network operators). In this example, test system 202 and/or related entities can test virtual resources of NFVI 114 using open-source and/or proprietary tools or applications that can isolate and/or identify configuration issues and performance bottlenecks. Continuing with this example, the test results may be compared to preconfigured performance levels, which can yield an easy to understand 'Pass' or 'Fail' result, displayed via a user interface.

In some embodiments, test system 202 and/or related entities may utilize one or more testing algorithms for identifying test configuration information and using the test configuration information to test and/or validate SUT 222. For example, an example testing algorithm may include: identifying a validation target and specifying configuration parameters for communicating with SUT 222 or entities therein; identifying the VNF type (e.g., the application or network function for which the infrastructure is to be validated) and its requirements on the underlying infrastructure; generating and/or configuring test cases to be executed (e.g., based on workload(s) that represents the application or network function for which the infrastructure is to be validated); executing the test cases on SUT 222; and obtaining, collecting and/or analyzing test results and/or other test related data for reporting to a test operator or other entity.

In some embodiments, test system 202 and/or related entities may configure and deploy one or more VNFTIs 220 that execute concurrently with VNFs 104 and/or in the same VNF environment as VNFs 104 that use SUT 222. For example, TO 204 may communicate instructions to VIM 136 for configuring and controlling execution of VNFTIs 220, e.g., each of VNFTIs 220 may be configured to behave according to a specified set of test case parameters or configuration information. For example, VNFTIs 220 may be referred to as "noisy neighbors" because VNFTIs 220 may be configured to steal or compete with VNFs 104 or other VNFTI 220 for a resource or type of resource, e.g., virtual memory, storage, compute, or network resources. In some embodiments, TO 204 may monitor performance of VNFTIs 220, e.g., via communication with VIM 136 via a VIM API.

In some embodiments, test system 202 and/or related entities may configure and deploy one or more VRTs 214-218 that execute concurrently with VNFs 104 and/or in the same VNF environment as VNFs 104 that use SUT 222. For example, RTM 206 may communicate instructions to VIM 136 for configuring and controlling execution of VRTs 214-218, e.g., each of VRTs 214-218 may be configured to behave according to a specified set of test case parameters or configuration information. For example, each of VRTs 214-218 may test a different virtual resource. In some embodiments, TO 204 may monitor performance of VRTs 214-218 (e.g., via communication with VIM 136 via a VIM API).

In some embodiments, test system 202 and/or related entities (e.g., TO 204) may generate a test plan comprising one or more workloads for testing various aspects of SUT 222 concurrently or at different times. For example, test system 202 may generate a test plan to ensure both internal validation (from a VNF perspective) as well as external validation (from a Network perspective) by testing communications with SUT 222 via internal communications interfaces (e.g., to VNFs or tester instances within the NFV environment) and by testing communications with SUT 222 via external communications interfaces (e.g., to VNFs or tester instances from outside the NFV environment). In this example, testing from various perspectives allows test system 202 to more effectively determine the capabilities and performance of SUT 222.

In some embodiments, a test plan may involve instructing the VIM 136 to create 15 VRTs (e.g., VC tester instances 214, VN tester instances 216, VS tester instances 218) and 10 "noisy neighbor" instances (e.g., VNFTIs 220), where the "noisy neighbor" instances are configured to compete or attempt to compete for memory resources (e.g., by generating a large amount of memory read and/or memory right requests for VS resources 120. In this example, to test internal communications interfaces with SUT 222, the test plan may involve configuring and/or instructing a virtual traffic generator (e.g., IxNetwork VE traffic generator) to generate test traffic (e.g., a workload that may emulate one or more communications flows involving requests and answers messages) directed at the 15 VRTs or the 10 "noisy neighbor" instances via one or more internal interfaces associated with SUT 222. Continuing with this example, to test external communications interfaces with SUT 222, the test plan may also involve configuring and/or instructing an external traffic generator (e.g., IxNetwork traffic generator) to generate test traffic (e.g., a workload that may emulate one or more communications flows involving requests and answers messages) directed at the 15 VRTs or the 10 "noisy neighbor" instances via one or more external interfaces associated with SUT 222.

In some embodiments, e.g., where internal communications interfaces are used during testing of SUT 222, a virtual traffic generator may be implemented as VNF or a tester instance in the same virtual functions environment 212 using NFVI 114.

In some embodiments, e.g., where external communications interfaces are used during testing of SUT 222, traffic generator 210 may be used for generating and sending test traffic to SUT 222 via external communications interfaces. In such embodiments, traffic generator 210 may be virtual (e.g., a VNF) or physical (e.g., as a specialized hardware appliance) and may be implemented on test system 202 or another node.

In some embodiments, a test plan may involve monitoring or reporting actions to be performed before, during, and after testing. For example, a test plan may indicate how test system 202 or a related entity is going to obtain, use, and/or analyze test related information (e.g., baseline data, test results, or performance metrics) from SUT 222 and/or test related entities (e.g., VRTs 214-218, VNFTI 220, and/or VIM 136). In this example, a test plan may also indicate how and/or what test related information or derived performance information is to be reported, displayed, or shared, e.g., to a test operator via a graphical user interface (GUI).

In some embodiments, test system 202 and/or related entities (e.g., TO 204) may directly monitor performance of tester instances 214-220 via communications and/or data received from tester instances 214-220. In some embodiments, e.g., alternatively or in addition to direct monitoring, test system 202 or a related entity (e.g., TO 204) may indirectly monitor performance of tester instances 214-220 via communications and/or data received from VIM 136 or another management entity associated with management system 130.

In some embodiments, test system 202 and/or related entities (e.g., TO 204) may use information received from multiple sources (e.g., tester instances 214-220 and/or management system 130) to calibrate and/or analyze internal NFV monitoring functions (e.g., associated with VIM 136 and/or other MANO entities in management system 130). For example, test system 202 and/or related entities (e.g., TO 204) may query VIM 136 via a VIM API to obtain test performance information regarding tester instances 214-220 and may compare the test performance information from VIM 136 to test performance information reported or obtained directly from tester instances 214-220. In this example, if the difference between the test performance information collected from the difference is significant (e.g., by exceeding a predefined threshold value), test system 202 and/or related entities (e.g., TO 204) may determine that internal NFV monitoring functions associated with VIM 136 may be inaccurate or experiencing issues, may use this knowledge to recalibrate received information for future testing and/or may report the information to a test operator or other entities, e.g., via a GUI or an API.

Some example features or advantages of test system 202 over other test systems may include performing comprehensive validation and benchmarking for OpenStack-based private clouds, utilizing predefined test scenarios with unique methodology tuned for NFVI validation, utilizing test cases usable for small test beds composed of single compute node, to large environments with many racks, validating SUT 222 from a VNF perspective through real workload emulation (e.g., performed by VNFTIs 220), validating SUT 222 from a network perspective through external traffic generation (e.g., performed by traffic generator 210), utilizing one or more virtual resource testers (VRTs) (e.g., VRTs 214-218) for individually validating virtual compute, network, and Storage performance, utilizing industry proven workload emulation from the OPNFV Yardstick project, utilizing custom built workload emulation for complete NFVI validation, measuring VIM performance with custom VM Instantiation and/or VM Termination test methodology, measuring NFVI scheduler capability to isolate good workloads from VNFTIs 220 that attempt to over-use related resources, executing multiple workloads sequentially for initial system characterization, executing multiple workloads in parallel and assessing their impact on each other, categorizing tests into suites and jobs for improving testing automation and repeatability, and/or controlling test system 202 or TO 204 via an intuitive user interface with dynamic real-time reporting.

It will be appreciated that FIG. 2 is for illustrative purposes and that various depicted entities, their locations, and/or their functions described above in relation to FIG. 2 may be changed, altered, added, or removed. For example, TO 204 may incorporate functionality of RTM 206 and TTM 208.

Figure 3:
FIG. 3 is a screenshot illustrating an example user interface for NFV infrastructure testing.

FIG. 3 is a screenshot illustrating an example user interface 300 for NFV infrastructure testing. In some embodiments, test system 202, TO 204, and/or another entity may include user interface 300 for selecting and/or configuring settings associated with one or more tests during a test session. In some embodiments, user interface 300 may also be for controlling execution of a test session or tests therein. For example, a test operator may select various tests or test suites (e.g., a group of related tests) to execute for testing SUT 222 and then view execution progress of the tests or test suites via user interface 300.

In some embodiments, user interface 300 may include user interface elements that can display job related information. For example, job related information may include details about a test (e.g., a set of actions performed by one or more of VNFTIs 220 or VRTs 214-218). Some example job related information may include test status (e.g., pending, stated, ended), test binary result (e.g., pass/fail), a test owner (e.g., a test operator's name), a test identifier, related tests or sub-tests, test metrics, and/or other details.

In some embodiments, user interface 300 may include user interface elements that allow users to control execution of a test session or test therein. For example, a user may click a play icon to start executing a test and, during execution of the test, may click a pause or stop icon to pause or stop the execution of the test.

It will be appreciated that FIG. 3 is for illustrative purposes and that various aspects described above in relation to FIG. 3 may be changed, altered, added, or removed. For example, some user interface elements and/or features described in FIG. 3 may be removed or modified.

Figure 4:
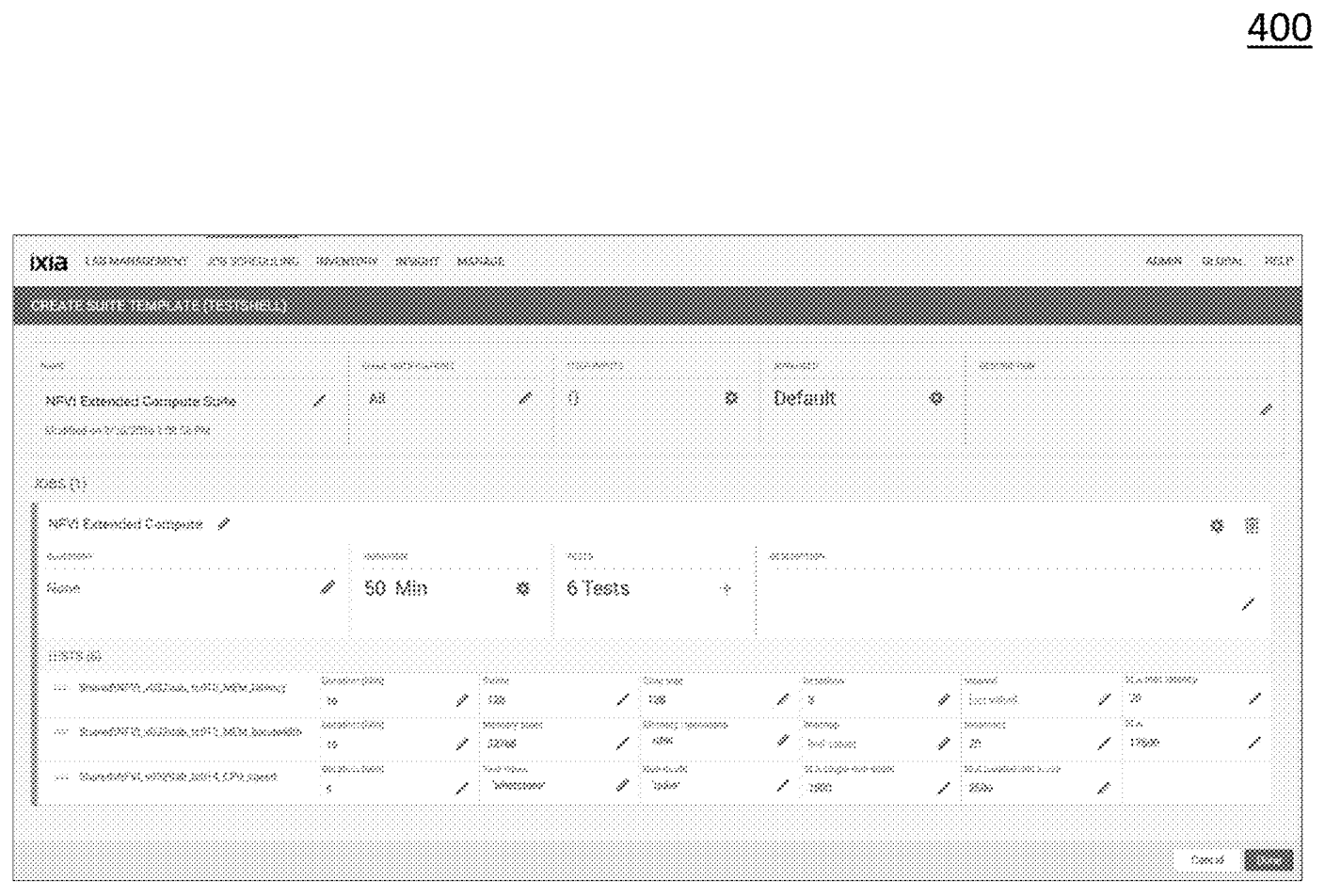

FIG. 4 is a screenshot illustrating an example user interface 400 for test suite template creation. In some embodiments, test system 202, TO 204, and/or another entity may include user interface 400 for generating and/or configuring aspects of a test suite (e.g., one or more tests for testing a test case or scenario) or a related template (e.g., a plan that indicates one or more related tests to execute). For example, a test operator may select a number of tests, also referred to as jobs) to associated with a new test suite template via user interface 400.

In some embodiments, user interface 400 may include user interface elements for configuring settings associated with a test suite or tests therein. While suite settings and test settings can vary (e.g., depending on the types of systems or software being tested) some example suite settings may include email notifications, user inputs, suite metadata (e.g., descriptions), a blueprint (e.g., a timing diagram), a test suite time duration, and/or other settings or configurations and some test settings may include a test time duration, a stride value, a stop size, an iteration value, an interval value, a SLA maximum latency, memory sizes values, a memory operations mode, a warmup value, an SLA value, a test types value, a run mode, a SLA single minimum score, and a SLA parallel minimum score.

It will be appreciated that FIG. 4 is for illustrative purposes and that various aspects described above in relation to FIG. 4 may be changed, altered, added, or removed. For example, some user interface elements and/or features described in FIG. 4 may be removed or modified.

Figure 5:
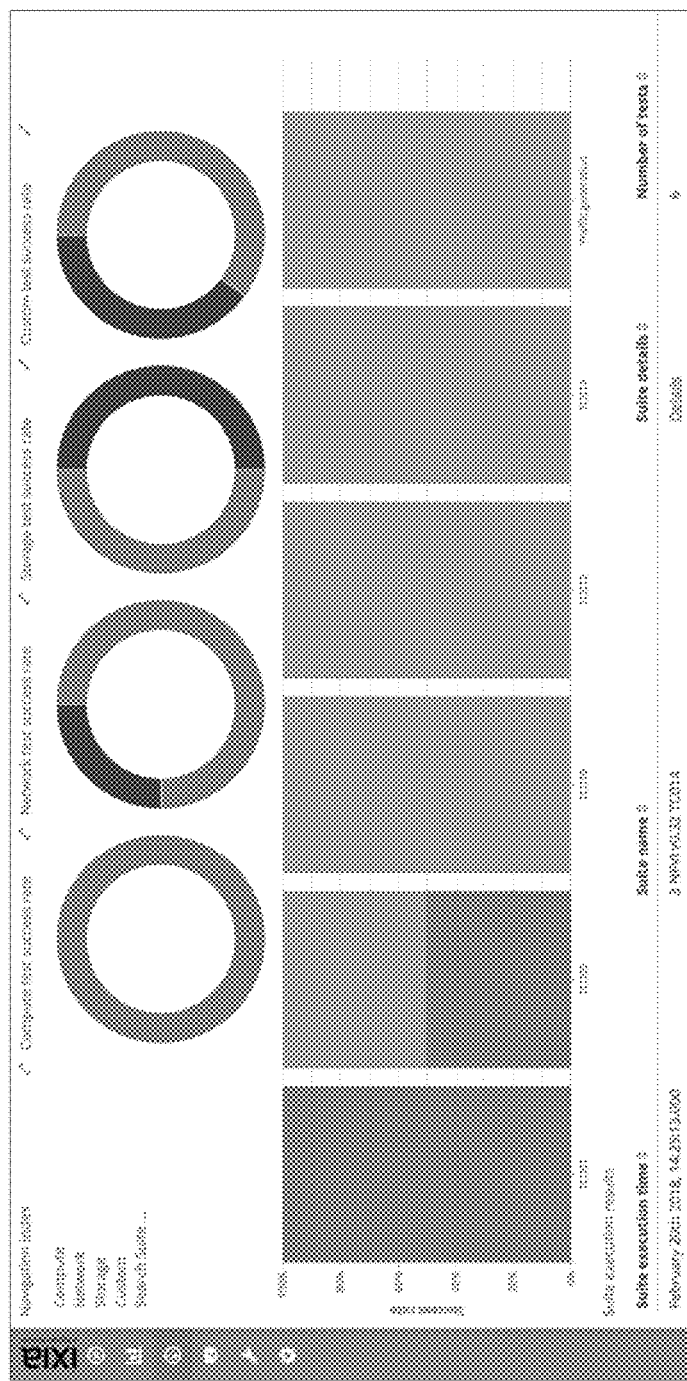
FIG. 5 is a screenshot illustrating an example user interface for displaying test session related information.

FIG. 5 is a screenshot illustrating an example user interface 500 for displaying test session related information. In some embodiments, test system 202, TO 204, and/or another entity may include user interface 500 for displaying success rates or other metrics of a test session or related information. For example, a test operator may view success rates of various test suites (e.g., test suites for testing different virtual resources) via user interface 500.

In some embodiments, user interface 500 may include user interface elements that graphically depict success rates of test suites or tests therein using circle graphs, bar graphs, or other graphics. For example, a circle graph may represent success rates for a number of tests in a compute test suite. In this example, a first portion of the circle may be colored a first color (e.g., green) to indicate the number of successful tests executed in the compute test suite and the remaining portion may be colored a second color (e.g., red) to indicate the number of unsuccessful tests executed in the compute test suite. In another example, a bar graph containing multiple bars, where each bar may represent the success rate of executing a particular test one or more times. In this example, a first portion of one bar may be colored a first color (e.g., light gray) to indicate the percentage of successful runs of the test (e.g., test 'TC0014') and the remaining portion of the bar may be colored a second color (e.g., dark gray) to indicate the percentage of successful runs of the test (e.g., test 'TC0014').

In some embodiments, user interface 500 may include user interface elements that provide additional information about one or more test suites or tests therein. For example, user interface 500 may display a table containing text (e.g., description, start time of test or test suite, results, etc.) and hyperlinks for additional details and/or visuals related to testing.

It will be appreciated that FIG. 5 is for illustrative purposes and that various aspects described above in relation to FIG. 5 may be changed, altered, added, or removed. For example, some user interface elements and/or features described in FIG. 5 may be removed or modified.

Figure 6:
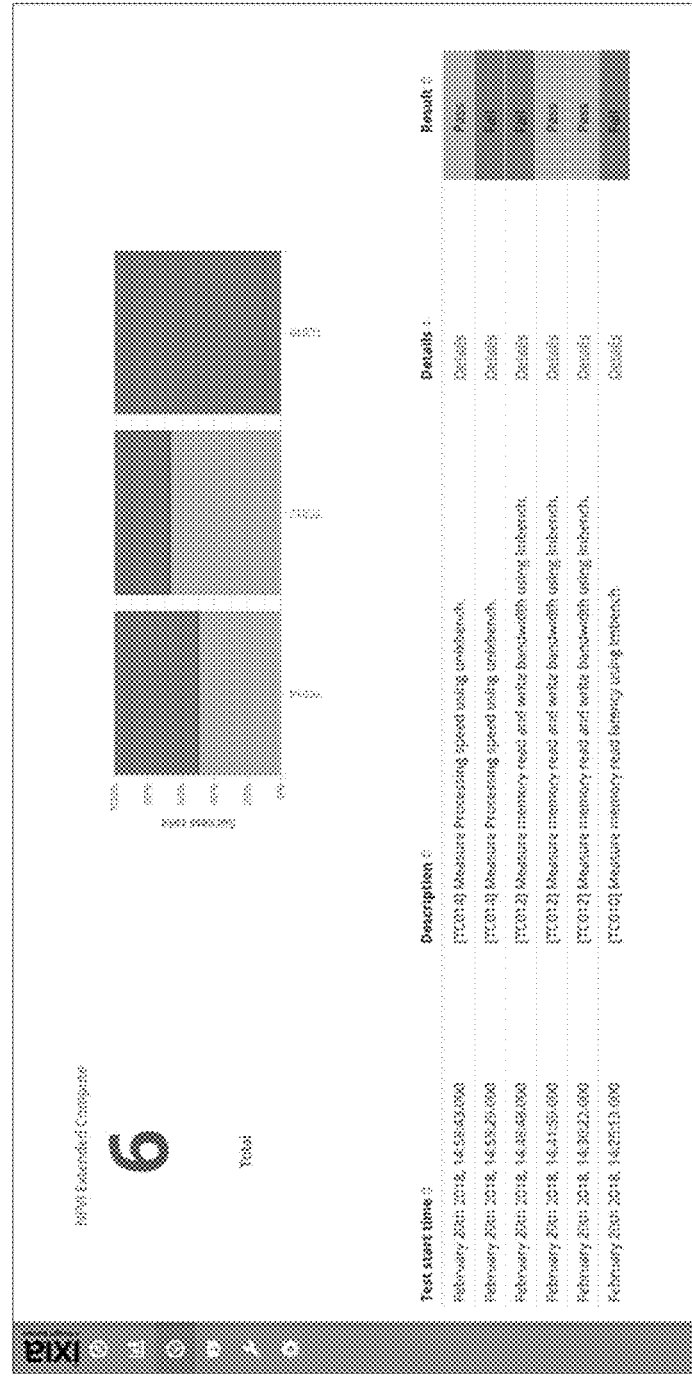
FIG. 6 is a screenshot illustrating an example user interface for displaying test suite related information.

FIG. 6 is a screenshot illustrating an example user interface 600 for displaying test suite related information. In some embodiments, test system 202, TO 204, and/or another entity may include user interface 600 for displaying success rates or other metrics of a test session or related information. For example, a test operator may view success rates of various test suites (e.g., test suites for testing different virtual resources) via user interface 600.

In some embodiments, user interface 600 may include user interface elements that graphically depict success rates of test suites or tests therein using circle graphs, bar graphs, or other graphics. For example, user interface 600 may depict a bar graph containing three bars, where each bar may represent a success rate of a particular test in a 'NFVI Extended Compute' test suite. In this example, the left-most bar may represent the success rate of executing test 'TC0014' two times. Continuing with this example, a first portion of the left-most bar may be colored a first color (e.g., light gray) to indicate the percentage of successful runs of test 'TC0014' and the remaining portion of the left-most bar may be colored a second color (e.g., dark gray) to indicate the percentage of successful runs of test 'TC0014'.

In some embodiments, user interface 600 may include user interface elements that provide additional information about one or more test suites or tests therein. For example, user interface 600 may display a table containing text (e.g., description, start time of test or test suite, results, number of tests or runs, etc.) and hyperlinks for additional details and/or visuals related to testing.

It will be appreciated that FIG. 6 is for illustrative purposes and that various aspects described above in relation to FIG. 6 may be changed, altered, added, or removed. For example, some user interface elements and/or features described in FIG. 6 may be removed or modified.

Figure 7:
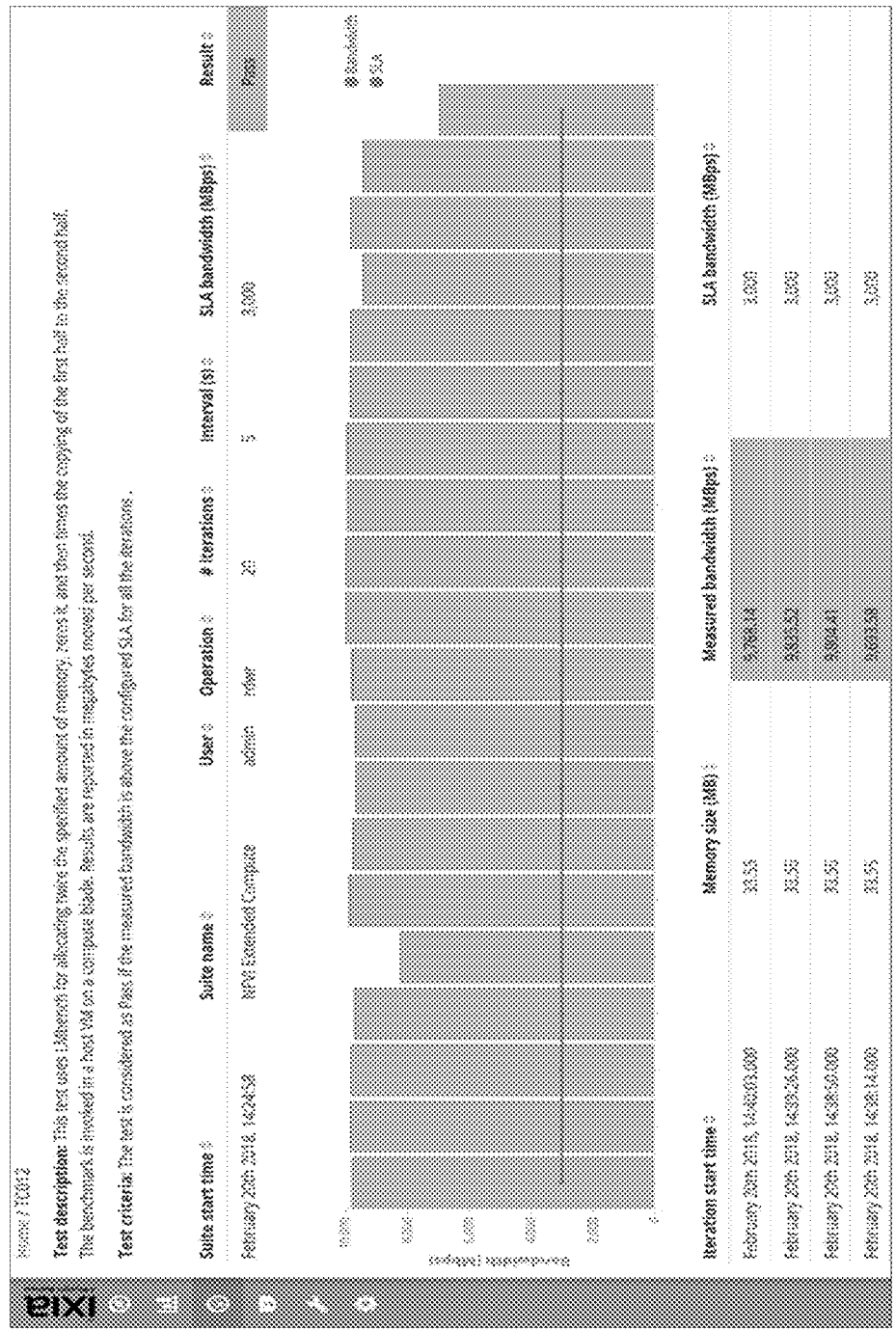
FIG. 7 is a screenshot illustrating an example user interface for displaying test related information.

FIG. 7 is a screenshot illustrating an example user interface 700 for displaying test related information. In some embodiments, test system 202, TO 204, and/or another entity may include user interface 700 for displaying statistics or metrics associated with a test or actions therein. For example, a test operator may view measured bandwidth values for a number of iterations of actions (e.g., repeated actions) executed during a bandwidth test via user interface 700.

In some embodiments, user interface 700 may include user interface elements that provide additional information about a test suite or tests therein. For example, user interface 700 may display text (e.g., description, start time of iteration and/or test suite, results, number of tests or iterations, etc.) and hyperlinks for additional details and/or visuals related to testing.

In some embodiments, user interface 700 may include user interface elements that graphically depict a relevant test metric therein using circle graphs, bar graphs, or other graphics. For example, user interface 700 may depict a bar graph containing twenty bars, where each bar may represent the average measured bandwidth in megabytes per second (MBps) for an iteration of test actions. In this example, a line may overlay the bar graph indicating a SLA bandwidth requirement (e.g., 3000 MBps).

It will be appreciated that FIG. 7 is for illustrative purposes and that various aspects described above in relation to FIG. 7 may be changed, altered, added, or removed. For example, some user interface elements and/or features described in FIG. 7 may be removed or modified.

Figure 8:
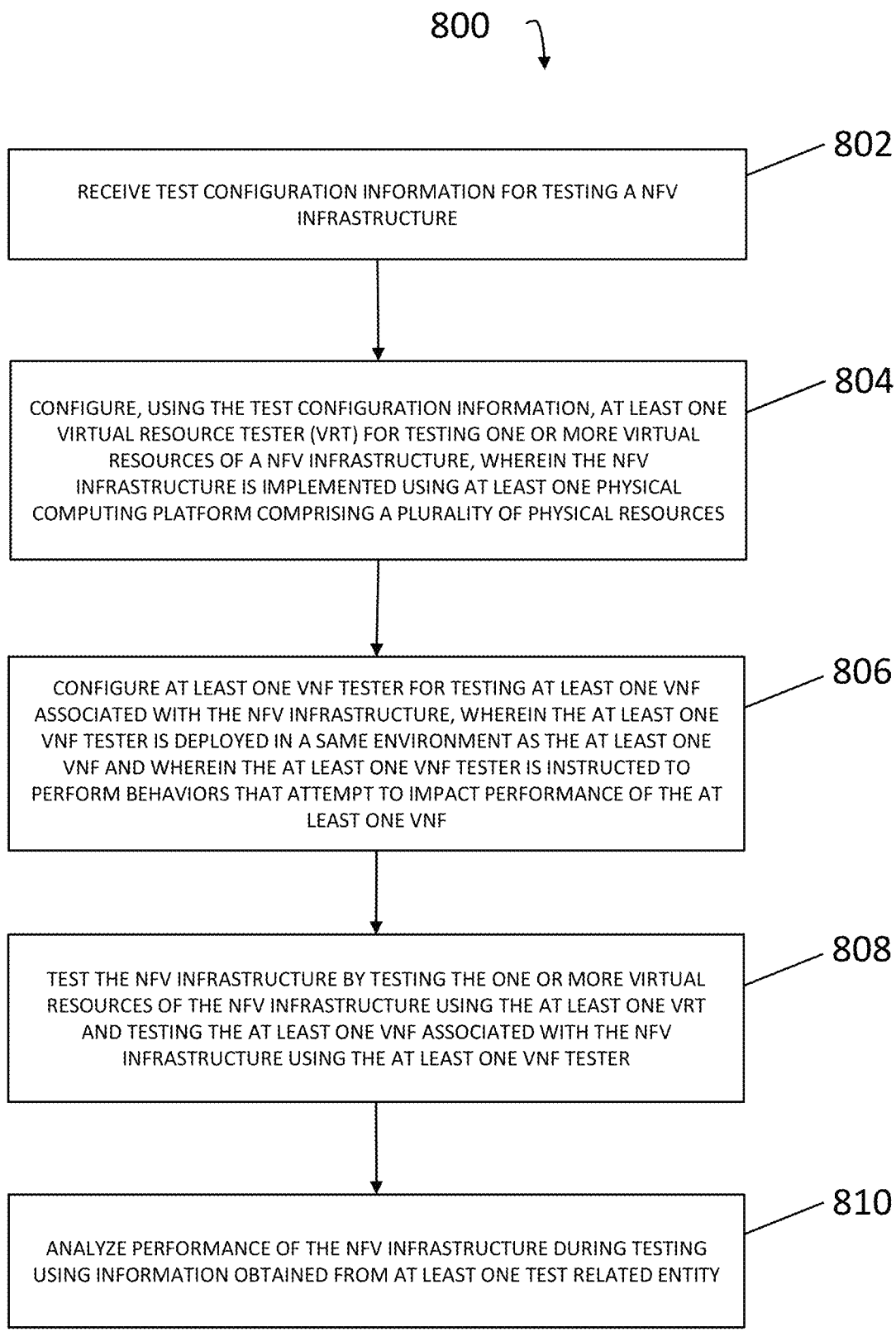
FIG. 8 is a diagram illustrating an example process for testing virtualized network functions and related infrastructure.

FIG. 8 is a diagram illustrating an example process 800 for testing virtualized network functions and related infrastructure. In some embodiments, process 800, or portions thereof, may be performed by or at test system 202, TO 204, RTM 206, TTM 208, traffic generator 210, and/or another node or module. In some embodiments, process 800 may include steps 802, 804, 806, and/or 808.

Referring to process 800, in step 802, test configuration information for testing a NFV infrastructure may be received. For example, test system 202 or a related entity may receive information about a number of virtual resources supported or provided by a network operator. In this example, test system 202 or a related entity may also receive information about one or more VNFs 104 that are to utilize these virtual resources, including minimum requirements.

In step 804, at least one VRT may be configured for testing one or more virtual resources of the NFV infrastructure, where the NFV infrastructure may be implemented using at least one physical computing platform comprising a plurality of physical resources. For example, a VRT (e.g., VC tester instance 214) may be instantiated and/or configured to test virtual compute resources 116 by test system 202 or a related entity, e.g., RTM 206.

In step 806, at least one VNF tester may be configured for testing at least one VNF associated with the NFV infrastructure, wherein the at least one VNF tester may be deployed in a same environment as the at least one VNF and wherein the at least one VNF tester may be instructed to perform behaviors that attempt to impact performance of the at least one VNF. For example, a VNF tester (e.g., VFTI #1 220) may be instantiated and/or configured by test system 202 or a related entity, e.g., TO 204, to monopolize or attempt to monopolize resources (e.g., virtual or physical resources) used by VNF #1 142. In this example, VNF #1 142 may be a specialized virtual switch that processes packets containing a signaling protocol and the VNF tester may attempt to utilize all available virtual compute resources 116 and VN resources 118 in an effort to impact the performance of VNF #1 142.

In step 808, the NFV infrastructure may be tested by testing the one or more virtual resources of the NFV infrastructure using the at least one VRT and testing the at least one VNF associated with the NFV infrastructure using the at least one VNF tester. For example, test system 202 may configure a test for testing SUT 222, where VRTs 214-218 test virtual resources 116-120 (e.g., using resource based CLI applications) and VNFTIs 220 test VNFs 104 (e.g., by having VNFTIs 220 attempt to use, consume, or steal resources potentially usable by or needed by VNFs 104). In this example, the test may involve testing virtual resources 116-120 concurrently with testing VNFs 104. In another example, testing of virtual resources 116-120 and testing of VNFs 104 or test portions thereof may occur at different times.

In step 810, performance of the NFV infrastructure during testing may be monitored using information obtained from at least one test related entity. For example, test system 202 or a related entity may receive test related information (e.g., performance metrics, statistics, etc.) from VNFTIs 220, VRTs 214-218, VIM 136, and/or entities. In this example, test system 202 or a related entity may attempt to analyze the test related information to identify various issues related to SUT 222 or entities therein, e.g., whether NTFI 220 and/or VRTs 116-120 impacted performance of testing of VNFs 104 or whether VIM 136 was unable to perform (e.g., allocate virtual resources, perform accurate internal performance monitoring, deallocate virtual resources, communicate efficiently with test system or other entities, etc.) as expected.

In some embodiments, test system 202 or a related entity (e.g., test TTM 208) may configure a virtual traffic generator in the same environment as at least one VNF being tested, wherein the virtual traffic generator sends test traffic to at least one VNF tester or the at least one VNF via an internal communications interface. For example, test TTM 208 may instantiate and/or configure a VNF (e.g., VNFTI #2 220) in the virtual functions space 140. In this example, the VNF may generate and send test packets to other virtual functions (e.g., VNF #2 142 or VNFTI #3 220).

In some embodiments, test system 202 or a related entity (e.g., test TTM 208) may configure a traffic generator external to at least one physical computing platform implementing the NFV infrastructure being tested, wherein the traffic generator sends test traffic to at least one VNF tester or at least one VNF via an external communications interface. For example, test TTM 208 may configure traffic generator 210 to generate and send test packets via an external IP communications interface between test system 202 and SUT 222 or entity therein.

In some embodiments, test system 202 or a related entity (e.g., TO 204) may be configured for sending instructions to VIM 136 for triggering VIM 136 to instruct (e.g., instantiate and/or configure) at least one VNF tester.

In some embodiments, test system 202 or a related entity (e.g., TO 204) may be configured for testing VIM 136 by sending one or more test messages related to setting up, configuring, or tearing down VNFs, receiving responses to the test messages from VIM 136, and determining performance of the VIM based on the responses.

In some embodiments, at least one VRT tests a virtual storage resource, a virtual network resource, or a virtual compute resource. For example, a VRT may include one or more of tester instance 214-218.

In some embodiments, monitoring the performance of the NFV infrastructure may include querying VIM 136 via an API to obtain test performance information and comparing the test performance information from VIM 136 and test performance information obtained from the at least one VNF tester (e.g., VNFTI #2 220).

In some embodiments, at least one test related entity for providing test results or other test related information may include the at least one VNF, the at least one VNF tester, VIM 136, NFV orchestrator 132, a VNF manager 134, or the at least one VRT.

In some embodiments, at least one VNF to be tested may include a load balancing function, an intrusion detection function, an intrusion protection function, an antivirus function, an antispam function, a firewall function, a switching function, a policy and/or charging control function, a mobile communications network function, or a routing function.

It will be appreciated that process 800 is for illustrative purposes and that different and/or additional actions may be used. It will also be appreciated that various actions described herein may occur in a different order or sequence.

It should be noted that test system 202 and/or functionality described herein may constitute a special purpose computing device. Further, test system 202 and/or functionality described herein can improve the technological field of testing VNFs and related NFV infrastructure. For example, by using VNFTIs 220 that attempt to impact performance of other VNFs that use a same NFV infrastructure, using VRTs 214-218 to test virtual resources in the NFV infrastructure, and monitoring test related performance of the NFV infrastructure from various sources, test system 202 can identify issues with NFV infrastructure and VIM 136, e.g., issues involving VNF isolation, VNF management, virtual resource management and usage, VIM interaction, and/or VNF performance monitoring.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for testing network function virtualization (NFV) infrastructure, the method comprising:
    at a test system implemented using at least one processor:
        receiving test configuration information for testing a NFV infrastructure;
        configuring, using the test configuration information, at least one virtual resource tester (VRT) for testing one or more virtual resources of the NFV infrastructure, wherein the NFV infrastructure is implemented using at least one physical computing platform comprising a plurality of physical resources;
        configuring at least one VNF tester for testing at least one VNF associated with the NFV infrastructure, wherein the at least one VNF tester is deployed in a same environment as the at least one VNF and wherein the at least one VNF tester is instructed to perform behaviors that attempt to impact performance of the at least one VNF, wherein the at least one VNF tester is instructed to attempt to monopolize resources of the NFV infrastructure available to the at least one VNF;
        testing the NFV infrastructure by testing the one or more virtual resources of the NFV infrastructure using the at least one VRT and testing the at least one VNF associated with the NFV infrastructure by using the at least one VNF tester to request or use at least some of the resources of the NFV infrastructure available to the at least one VNF; and
        monitoring performance of the NFV infrastructure during testing using information obtained from at least one test related entity, wherein monitoring the performance of the NFV infrastructure includes determining whether the at least one VNF is isolated from NFV infrastructure resource monopolization associated with the at least one VNF tester and wherein monitoring the performance of the NFV infrastructure includes querying a virtualized infrastructure manager (VIM) via an application programming interface to obtain test performance information and comparing the test performance information from the VIM and test performance information obtained from the at least one VNF tester, wherein the test system is external to the at least one physical computing platform implementing the NFV infrastructure and is external to a management system comprising the VIM.

2. The method of claim 1 comprising:
    configuring a virtual traffic generator in the same environment as the at least one VNF, wherein the virtual traffic generator sends test traffic to the at least one VNF tester or the at least one VNF via an internal communications interface.

3. The method of claim 1 comprising:
configuring a traffic generator external to the at least one physical computing platform implementing the NFV infrastructure, wherein the traffic generator sends test traffic to the at least one VNF tester or the at least one VNF via an external communications interface.

4. The method of claim 1 wherein the test system is configured for sending instructions to a virtualized infrastructure manager (VIM) for triggering the VIM to instruct the at least one VNF tester.

5. The method of claim 4 wherein the test system is configured for testing the VIM by sending one or more test messages related to setting up, configuring, or tearing down VNFs, receiving responses to the test messages from the VIM, and determining performance of the VIM based on the responses.

6. The method of claim 1 wherein the at least one VRT tests a virtual storage resource, a virtual network resource, or a virtual compute resource.

7. The method of claim 1 wherein the test related entity includes the at least one VNF, the at least one VNF tester, a virtualized infrastructure manager (VIM), a NFV orchestrator, a VNF manager, or the at least one VRT.

8. The method of claim 1 wherein the at least one VNF includes a load balancing function, an intrusion detection function, an intrusion protection function, an antivirus function, an antispam function, a firewall function, a switching function, a policy and/or charging control function, a mobile communications network function, or a routing function.

9. A system for testing network function virtualization (NFV) infrastructure, the system comprising:
at least one processor;
memory; and
a test system implemented using the at least one processor and the memory, wherein the test system is configured for:
receiving test configuration information for testing a NFV infrastructure;
configuring, using the test configuration information, at least one virtual resource tester (VRT) for testing one or more virtual resources of the NFV infrastructure, wherein the NFV infrastructure is implemented using at least one physical computing platform comprising a plurality of physical resources;
configuring at least one VNF tester for testing at least one VNF associated with the NFV infrastructure, wherein the at least one VNF tester is deployed in a same environment as the at least one VNF and wherein the at least one VNF tester is instructed to perform behaviors that attempt to impact performance of the at least one VNF, wherein the at least one VNF tester is instructed to attempt to monopolize resources of the NFV infrastructure available to the at least one VNF;
testing the NFV infrastructure by testing the one or more virtual resources of the NFV infrastructure using the at least one VRT and testing the at least one VNF associated with the NFV infrastructure by using the at least one VNF tester to request or use at least some of the resources of the NFV infrastructure available to the at least one VNF; and
monitoring performance of the NFV infrastructure during testing using information obtained from at least one test related entity, wherein monitoring the performance of the NFV infrastructure includes determining whether the at least one VNF is isolated from NFV infrastructure resource monopolization associated with the at least one VNF tester and wherein monitoring the performance of the NFV infrastructure includes querying a virtualized infrastructure manager (VIM) via an application programming interface to obtain test performance information and comparing the test performance information from the VIM and test performance information obtained from the at least one VNF tester, wherein the test system is external to the at least one physical computing platform implementing the NFV infrastructure and is external to a management system comprising the VIM.

10. The system of claim 9 wherein the test system is configured for:
configuring a virtual traffic generator in the same environment as the at least one VNF, wherein the virtual traffic generator sends test traffic to the at least one VNF tester or the at least one VNF via an internal communications interface.

11. The system of claim 9 wherein the test system is configured for:
configuring a traffic generator external to the at least one physical computing platform implementing the NFV infrastructure, wherein the traffic generator sends test traffic to the at least one VNF tester or the at least one VNF via an external communications interface.

12. The system of claim 9 wherein the test system is configured for sending instructions to a virtualized infrastructure manager (VIM) for triggering the VIM to instruct the at least one VNF tester.

13. The system of claim 12 wherein the test system is configured for testing the VIM by sending one or more test messages related to setting up, configuring, or tearing down VNFs, receiving responses to the test messages from the VIM, and determining performance of the VIM based on the responses.

14. The system of claim 9 wherein the at least one VRT tests a virtual storage resource, a virtual network resource, or a virtual compute resource.

15. The system of claim 9 wherein the test related entity includes the at least one VNF, the at least one VNF tester, a virtualized infrastructure manager (VIM), a NFV orchestrator, a VNF manager, or the at least one VRT.

16. The system of claim 9 wherein the at least one VNF includes a load balancing function, an intrusion detection function, an intrusion protection function, an antivirus function, an antispam function, a firewall function, a switching function, a policy and/or charging control function, a mobile communications network function, or a routing function.

17. A non-transitory computer readable medium having stored thereon executable instructions embodied in the computer readable medium that when executed by at least one processor of a test system cause the test system to perform steps comprising:
receiving test configuration information for testing a network function virtualization (NFV) infrastructure;
configuring, using the test configuration information, at least one virtual resource tester (VRT) for testing one or more virtual resources of a NFV infrastructure, wherein the NFV infrastructure is implemented using at least one physical computing platform comprising a plurality of physical resources;
configuring at least one VNF tester for testing at least one VNF associated with the NFV infrastructure, wherein the at least one VNF tester is deployed in a same environment as the at least one VNF and wherein the at least one VNF tester is instructed to perform behaviors that attempt to impact performance of the at least one VNF, wherein the at least one VNF tester is instructed to attempt to monopolize resources of the NFV infrastructure available to the at least one VNF;

testing the NFV infrastructure by testing the one or more virtual resources of the NFV infrastructure using the at least one VRT and testing the at least one VNF associated with the NFV infrastructure by using the at least one VNF tester to request or use at least some of the resources of the NFV infrastructure available to and already used by the at least one VNF; and monitoring performance of the NFV infrastructure during testing using information obtained from at least one test related entity, wherein monitoring the performance of the NFV infrastructure includes determining whether the at least one VNF is isolated from NFV infrastructure resource monopolization associated with the at least one VNF tester and wherein monitoring the performance of the NFV infrastructure includes querying a virtualized infrastructure manager (VIM) via an application programming interface to obtain test performance information and comparing the test performance information from the VIM and test performance information obtained from the at least one VNF tester, wherein the test system is external to the at least one physical computing platform implementing the NFV infrastructure and is external to a management system comprising the VIM.

18. The non-transitory computer readable medium of claim 17 comprising executable instructions for configuring a virtual traffic generator in the same environment as the at least one VNF, wherein the virtual traffic generator sends test traffic to the at least one VNF tester or the at least one VNF via an internal communications interface.

* * * * *